Patented Apr. 3, 1934

1,953,077

UNITED STATES PATENT OFFICE 1,953,077

PROCESS OF PREVENTING DETERIORATION OF FOOD PRODUCTS

Ralph L. Feagles, Fort Wayne, Ind., assignor to Chalfant Can Company, Fort Wayne, Ind., a corporation of Indiana No Drawing. Application May 31, 1930, Serial No. 458,921

4 Claims. (Cl. 99—8)

The invention relates to the process of preventing deterioration of food products, particularly dairy products, which may ferment or oxidize before losing their food value, by excluding air from them and releasing any gas formed at low pressure.

Heretofore food bacteriologists have held that raw food products being held or transported should be open to the air to permit the escape of undesirable gases. This contention has been especially prevalent among scientific men in the dairy industry who have maintained that failure to stir and cool fresh milk from the cow before placing it in a can for shipment and leaving the can open to the air to allow undesirable gases to escape, results in "smothering" the milk or cream.

After much experimenting and investigation I have found that where a healthy cow has been fed proper food, her milk drawn and handled in a clean manner contains practically no detrimental gases or bacteria, in consequence of which the idea of "smothering" would seem to be fallacious. The few bacteria that are unavoidably in the milk or cream soon become active at normal temperature, most of the proteolytic family of bacteria being air breathers.

I have found that when an air-tight receptacle is substantially filled with a food product that may oxidize before it loses its food value, the bacteria breathe and throw off from their bodies carbon dioxide which is a preservative or antiseptic. The proteolytic bacteria are inhibited by the carbon dioxide as it replaces the oxygen in the receptacle. As fermentation proceeds acid develops which stops the growth of bacteria and yeasts. Molds which might draw sustenance from the oxygen of the acid formed are inhibited by the carbon dioxide given off by the bacteria. In the case of cream carbon dioxide is the predominant gas given off by the micro-organisms therein. Other gases which have desirable and undesirable action on the cream are also produced and at times gases having an offensive odor are produced which come from the food eaten by the animal. These gases mix with the carbon dioxide and build up a pressure in the receptacle. If the proportion of the other gases is too great the effectiveness of the carbon dioxide to inhibit the growth of bacteria is lessened yet there must be a high enough pressure in the receptacle to permit the carbon dioxide and other preservative gases to contact with the product. Hence I have found that there is a critical pressure involved in the storage of dairy products such as cream, sweet or sour, in air tight receptacles, namely, a pressure high enough to assure contact of the autogenously generated carbon dioxide and preservative gases with the product and low enough to permit frequent venting of the gases in order to diminish the same and maintain the proportion of undesirable gases at a minimum. The receptacle should be self venting and I have found that best results are accomplished where the receptacle vents at a pressure of approximately four pounds per square inch. This critical pressure and venting of the receptacle permit the carbon dioxide and the other preservative gases to be effective on the bacteria so that the lactic acid may build up until it is strong enough to overcome the bacteria itself.

The process is applicable to various food products, especially to dairy products such as cream, both sweet and sour, cheese, etc.

What I claim is:

1. The process of preventing the deterioration of dairy products which consists in holding the products in air-tight, substantially full receptacles that intermittently vent at approximately four pounds per square inch.

2. The process of preventing the deterioration of cream which consists in holding the cream in air-tight, substantially full receptacles that vent at a pressure approximately four pounds per square inch.

3. The process of preventing the deterioration of sour cream which consists in holding the cream in air-tight, substantially full receptacles that vent at a pressure approximately four pounds per square inch.

4. The process of preventing the deterioration of cream which comprises the keeping of the product out of contact with the air and in contact with gas formed by the product and at a pressure of approximately four pounds per square inch.

RALPH L. FEAGLES.